US012693237B2

(12) United States Patent
Bohleber et al.

(10) Patent No.: US 12,693,237 B2
(45) Date of Patent: Jul. 28, 2026

(54) APPARATUS AND METHOD FOR EXAMINING CONTAINERS FOR IMPURITIES

(71) Applicant: Unisensor Sensorsysteme GmbH, Karlsruhe (DE)

(72) Inventors: Juergen Bohleber, Bühl (DE); Dirk Fey, Neewiller (FR); Marc Vollmer, Oberkirch (DE)

(73) Assignee: Unisensor Sensorsysteme GmbH, Karlsruhe (DE)

( * ) Notice: Subject to any disclaimer, the term of this patent is extended or adjusted under 35 U.S.C. 154(b) by 97 days.

(21) Appl. No.: 18/266,947

(22) PCT Filed: Dec. 13, 2021

(86) PCT No.: PCT/DE2021/200258
§ 371 (c)(1),
(2) Date: Jul. 31, 2023

(87) PCT Pub. No.: WO2022/128024
PCT Pub. Date: Jun. 23, 2022

(65) Prior Publication Data
US 2025/0085232 A1 Mar. 13, 2025

(30) Foreign Application Priority Data
Dec. 14, 2020 (DE) .................... 10 2020 215 850.9

(51) Int. Cl.
*G01N 21/90* (2006.01)
*B07C 5/34* (2006.01)
(Continued)

(52) U.S. Cl.
CPC ....... *G01N 21/9018* (2013.01); *B07C 5/3404* (2013.01); *G01N 1/2226* (2013.01); *G01N 21/33* (2013.01); *G01N 21/94* (2013.01)

(58) Field of Classification Search
CPC .... G01N 21/9018; G01N 21/94; G01N 21/88; G01N 21/8806; G01N 21/33; G01N 1/2226
(Continued)

(56) References Cited

U.S. PATENT DOCUMENTS 5,350,565 A 9/1994 Leveson et al.
5,376,550 A * 12/1994 Fine ...................... G01N 21/64
422/50
(Continued)

FOREIGN PATENT DOCUMENTS

DE 4427314 A1 2/1996
DE 19505474 A1 8/1996
DE 102004048146 A1 4/2006

OTHER PUBLICATIONS

Espacenet Bibliographic data: DE102004048146 (A1), Published Apr. 6, 2006, 1 pg.
(Continued)

*Primary Examiner* — Michael Mccullough
*Assistant Examiner* — Jessica L Burkman
(74) *Attorney, Agent, or Firm* — Rankin, Hill & Clark LLP

(57) ABSTRACT

A device for inspecting containers for foreign substances, including at least one sampling head, wherein by means of the at least one sampling head, a quantity of a first fluid is introducible into the at least one container contactlessly via an opening of the sampling head by means of a fluid introduction device and wherein by means of the sampling head, a quantity of a second fluid to be inspected for foreign substances is contactlessly removable from the at least one container, a measuring cell for optically inspecting the second fluid is at least partially arranged in the sampling head, preferably wherein an analysis device for analyzing the second fluid for foreign substances is arranged, which is (Continued)

connected to the measuring cell, in particular by means of an optical connection, in particular wherein the analysis device and the measuring cell are designed to determine foreign substances by means of UV spectroscopy of the second fluid and/or that a sorting device is arranged, which is designed to sort out containers deviating from a previously defined result on the basis of a result from the analysis device, in particular wherein the sorting device is designed to feed the containers again at least once for the inspection for foreign substances.

19 Claims, 4 Drawing Sheets

(51) Int. Cl.
  *G01N 1/22*        (2006.01)
  *G01N 21/33*       (2006.01)
  *G01N 21/94*       (2006.01)

(58) Field of Classification Search
  USPC ........................................................ 209/523
  See application file for complete search history.

(56)                References Cited

U.S. PATENT DOCUMENTS

| | | | |
|---|---|---|---|
| 5,567,623 | A | 10/1996 | Rounbehler et al. |
| 5,703,300 | A | 12/1997 | Gysi |
| 6,013,228 | A * | 1/2000 | Achter ...................... B08B 9/46 |
| | | | 422/50 |
| 11,548,036 | B2 | 1/2023 | Krieg et al. |
| 2021/0190735 | A1 * | 6/2021 | Bonda .................... G01N 30/24 |

OTHER PUBLICATIONS

Espacenet Bibliographic data: DE4427314 (A1), Published Feb. 15, 1996, 1 pg.
Espacenet Bibliographic data: DE19505474(A1), Published Aug. 22, 1996, 1 pg.
International Search Report for corresponding PCT/DE2021/200258 mailed Apr. 4, 2022, 12 pgs.

* cited by examiner

APPARATUS AND METHOD FOR EXAMINING CONTAINERS FOR IMPURITIES

This application claims priority in International Application PCT/DE2021/200258 filed on Dec. 13, 2021, which claims priority in German Patent Application DE 10 2020 215 850.9 filed on Dec. 14, 2020, which are incorporated by reference herein.

The present invention relates to a device for inspecting containers for foreign substances, comprising at least one sampling head, wherein by means of the at least one sampling head, a quantity of a first fluid is introducible into the at least one container contactlessly via an opening of the sampling head by means of a fluid introduction device and wherein by means of the sampling head, a quantity of a second fluid to be inspected for foreign substances is contactlessly removable from the at least one container.

The invention furthermore relates to a method for inspecting containers for foreign substances.

Although applicable to any fields, the present invention will be explained with respect to the multiple use of containers.

Although applicable to any containers, the present invention will be explained with respect to bottles, such as returnable bottles.

Although applicable to any foreign substances, the present invention will be explained with respect to gasoline.

BACKGROUND OF THE INVENTION

The use of plastics in the reusable area has recently gained renewed importance. Plastic waste is already having a significant impact on the environment, whether due to the pollution of bodies of water or the ever-increasing quantity of plastic waste. Nevertheless, plastic bottles are still very popular in the area of the beverage industry, not only because of their significantly lower weight in relation to glass bottles, but also because of their robustness. Reusable bottles, i.e., bottles that are (re) filled and sold with beverages multiple times in the course of their life, are used by some end consumers for purposes other than those for which they were intended. Reusable plastic bottles are also used to temporarily store oil, gasoline, paint, or the like therein. Due to their limited ability to expand under excessive pressure, they are also less dangerous in terms of explosion, etc. in comparison to glass bottles. Nevertheless, bottles used in this way can also be found in the recycling cycle. However, since these bottles can retain some of the foreign substances they previously contained, even after the bottle has been cleaned accordingly, for example because certain substances are lipophilic and diffuse into the plastic, these bottles may no longer be used for beverages or food—these substances can, for example, cause a bad taste upon refilling—and have to be reliably sorted out.

A device for inspecting containers for foreign substances is known from DE 10 2004 048 146 A1. Air is injected via a sampling head and via a compressed air lance after the sampling head has been put on a bottle. Gas can then be removed from the bottle via a removal line and the removed gas can be fed to an analysis system for further inspection.

It is problematic in this case that bottles can not only be contaminated with foreign substances, but can also have physical damage in the form of holes, broken edges, or the like, in particular in the area of the bottle opening. If the sampling head is now put on and compressed air is injected, external air can get into the bottle via such damage, for example, and thus falsify the measurement result for the withdrawn gas. In addition, the removed gas can also escape completely or at least partially from the defect, that is to say it cannot or not completely reach the analysis system, which can falsify the measurement result. Contaminated bottles are thus not sorted out and are returned to the bottling plant to be refilled with beverages.

U.S. Pat. No. 5,567,623 A shows a method and a system for inspecting substances in containers, such as glass or plastic bottles. A sampling head is used for this purpose, on the one hand to introduce an air blast into a bottle and on the other hand to detect a quantity of air in the area of the opening of the bottle outside of it. The quantity of air in the area outside the bottle is fed to an analysis unit via a removal line. There, the quantity of air fed is divided and one part is heated in the presence of nickel oxide, another part in the presence of ceramic materials. The two partial quantities of air are then fed to different detectors, which in turn provide corresponding detection signals. Based on the signal difference between the two signals provided, a decision is then made as to which material group is present in the quantity of air removed and ultimately whether the bottle should be sorted out.

SUMMARY OF THE INVENTION

It is therefore an object of the present invention to increase the reliability in the detection of foreign substances in containers without significantly increasing the production effort and costs. A further object of the present invention is to provide an alternative device for inspecting containers for foreign substances and an alternative method for inspecting containers for foreign substances.

The present invention achieves the above-mentioned object in a device for inspecting containers for foreign substances, comprising at least one sampling head, wherein by means of the at least one sampling head, a quantity of a first fluid is introducible into the at least one container contactlessly via an opening of the sampling head by means of a fluid introduction device and wherein by means of the sampling head, a quantity of a second fluid to be inspected for foreign substances is contactlessly removable from the at least one container, in that a measurement cell for visually inspecting the second fluid is at least partially arranged in the sampling head.

The present invention also achieves the above object with a method for inspecting containers for foreign substances by means of a device according to any one of claims 1-8, comprising the following steps a) feeding a container to the sampling head of the device in a suitable position for sampling, b) introducing a quantity of a first fluid into the container by means of the sampling head, c) removing a quantity of a second fluid from the at least one container for inspection for foreign substances by means of the sampling head, d) feeding the removed quantity of the second fluid into the measuring cell, e) performing a spectroscopic analysis of the second fluid in the measuring cell, and f) determining foreign substances in the container based on a result of the spectroscopic analysis.

The term "foreign substance" means any substance or mixture of substances that is not used or employed with respect to the container for its intended purpose. For example, in the case of a returnable beverage plastic bottle, the intended or appropriate use of the bottle is limited to the storage of substances drinkable by humans without significant health risks. Foreign substances for returnable plastic beverage bottles are, for example, gasoline, oil, urine, paint, solvents, etc.

The term "fluid" is to be understood as any substance or mixture of substances that is in a gaseous and/or liquid physical state.

The term "at least partially" with respect to the term "measuring cell" is to be understood as component parts, components, and/or parts of a measuring cell for the visual inspection of fluids that are exposed to light of at least one wavelength, for example a tube to be exposed to light of at least one wavelength, an optical feed line to the measuring cell, or the like. In this context, the wording "measuring cell at least partially arranged in the sampling head" means, for example, that an optical feed line for the measuring cell is arranged in the sampling head; the actual measuring cell can, but does not have to, be arranged in the sampling head. The term "at least partially" with respect to the term "measuring cell" is in particular not to be understood to mean any lines, pipes, or the like for feeding a fluid to the measuring cell.

One of the advantages achieved by the invention is that due to the arrangement of the measuring cell in the sampling head and the contactless sampling, a quick and reliable inspection for foreign substances in containers can take place. Holes and/or broken edges of the container are moreover less relevant for contactless sampling than when the sampling head is placed directly on an opening of the container. Overall, the reliability of the detection of foreign substances in containers is thus significantly increased. In addition, there are also no significant additional costs associated with this, since implementation is possible in a simple and cost-effective manner.

Further features, advantages, and preferred embodiments of the invention are described in or become apparent from the following subclaims.

According to an embodiment, an analysis device for analyzing the second fluid for foreign substances is arranged, which is connected to the measuring cell, in particular by means of an optical connection. This allows a simple and reliable inspection of containers for foreign substances. In addition, an optical connection between the analysis device and the measuring cell enables fast data transmission. The analysis device and the measuring cell can be designed in particular so as to carry out regular measurements on a reference fluid, in particular in the form of a gas, preferably nitrogen, to determine any deviations from a specified reference result and to compensate, in particular automatically, for the deviations in further measurements on fluid samples. In this way, unavoidable drifts can be automatically compensated for, so that high long-term stability, high sensitivity, and high measurement accuracy can be provided over time. For example, the following gas mixtures can be used as reference fluid: a) mixture of SO2 N38 (10 ppm by volume), propane N25 (40 ppm by volume), nitrogen N50 (remainder) and/or b) mixture of NH3 N38 (10 mol ppm) and N2 (remainder).

According to an embodiment, the sampling head is detachably arranged in a holding device. This enables quick exchangeability, for example for cleaning or in the event of damage. In addition, easy accessibility to the sampling head and thus to the measuring cell is provided.

According to an embodiment, the holding device includes at least two optical accesses, which are used for optical access to the measuring cell. One of the advantages thus possible is that the measuring cell can be exposed to light of at least one wavelength in a reliable manner. The light passing through the measuring cell can be guided from the measuring cell to a detector for analysis, which in turn is connected to an analysis device for determining foreign substances.

According to an embodiment, the opening of the sampling head is designed as a funnel, which is fluidically connected to the measuring cell, in an area adjacent to the opening of the container. Contactless sampling by means of the sampling head can thus be carried out in a particularly reliable manner, since a sufficiently large quantity of a fluid sample can always be "collected" from the interior of the container using the funnel and can be fed to an analysis device.

According to an embodiment, a fluid introduction device, in particular at least one injection tube, for introducing the first fluid is arranged in the funnel, which is connected to the fluid introduction device. One of the advantages thus possible is a compact arrangement of the introduction location of the first fluid and the removal location of the second fluid.

According to an embodiment, the fluid introduction device is arranged off-center in the funnel. If the fluid introduction device is arranged laterally, i.e., not centrally in the sampling head, an ellipse-like vortex, for example of air, is thereby generated in a bottle, so that any air layers that may be present are mixed. Foreign substances in the air from the lower layers thus reach the area of the opening of the bottle and can thus be transported to the analysis device by means of the sampling head. Overall, this improves the accuracy of the analysis and the reliability of removing the fluid sample.

According to an embodiment, the fluid introduction device includes a valve device having a plurality of, in particular, identical valves, for providing pressure pulses for the first fluid for introduction into the at least one container. One possible advantage of this is that particularly short pulses of the first fluid can be provided, since multiple smaller valves switch faster instead of one larger single valve, but overall the quantity of first fluid in the corresponding pulse does not change.

According to an embodiment, the opening of the sampling head is fluidically connected to the measuring cell via at least two lines. This enables the measuring cell to be filled with the second fluid quickly and at the same time reliably. Deposits or contamination due to fluid vortices are reduced in this way.

According to an embodiment, the at least two lines are arranged symmetrically to one another. This enables the same length of flow paths for the second fluid and a filling of the measuring cell that is as uniform as possible.

According to an embodiment, the measuring cell and/or the holding device and/or the lines are produced from metal, in particular stainless steel and/or aluminum and/or plastic. One advantage thus possible of such a low-migration material is that the measuring cell can be easily cleaned and has a long service life.

According to an embodiment, the measuring cell includes an outlet for discharging the second fluid, which can be connected to a negative pressure device, in particular wherein the outlet is arranged centrally on the measuring cell. One advantage thus possible is a reliable discharge of the second fluid from the measuring cell, at the same time, a central outlet, i.e., an outlet in the middle of an elongated measuring cell, ensures fewer pressure fluctuations over the length of the measuring cell, and at the same time the possibility of vortex formation is reduced.

According to an embodiment, a dirt collecting device, in particular in the form of a bulge, is arranged in the area of the outlet, in particular opposite the outlet, in the measuring cell. The advantage of this is that dirt from deposits of particles from the second fluid collects, for example, in a bulge provided for this purpose, so that reliable measurement of the second fluid by means of the measuring cell is still enabled.

According to an embodiment, a cleaning device is arranged for the measuring cell. This means, for example, that the measuring cell can be cleaned automatically, which further increases the service life of the measuring cell.

According to an embodiment, the cleaning device includes an introduction device for introducing a cleaning fluid into the measuring cell, in particular wherein the introduction device is designed to introduce the cleaning fluid into the measuring cell and/or into at least one line leading to the measuring cell at least two preferably opposite axial ends of the measuring cell. A possible advantage of this is that the measuring cell can be cleaned quickly and easily.

According to an embodiment, the sampling head has at least a two-part structure, in particular wherein the at least two parts are detachably attachable to one another, preferably by means of a screw connection. This enables the sampling head to be assembled quickly and produced in a simple and cost-effective manner.

According to an embodiment, the at least two parts have the same structure, in particular they are designed as half-shells. The advantage of this is a particularly simple and inexpensive production.

According to an embodiment, the analysis device and the measuring cell are designed to determine foreign substances by means of UV spectroscopy of the second fluid. The advantage of this is a reliable determination of foreign substances.

According to an embodiment, a conveyor device for the containers is arranged in such a way that the containers are guided past the sampling head. This enables fast and simultaneously easy sampling.

According to an embodiment, a fluid provision device is arranged, which is designed to provide the first fluid in the form of a gas or gas mixture. A fluid can be provided in a simple and reliable manner at the same time.

According to an embodiment, the gas can be provided in the form of oil-free air by means of the fluid supply device. The gas can thus be provided in a particularly favorable manner, for example by simply introducing purified ambient air under pressure into the container.

According to an embodiment, a sorting device is arranged, which is designed to sort out containers that deviate from a previously defined result based on a result of the analysis device. In this way, containers for which there is no result or a result that deviates from a previously defined result can be sorted out reliably. The previously defined result can be calibrated, for example, by a large number of containers in different residual quantities and different foreign substances, so that by comparing the stored result with the measured result, it is possible to sort out the corresponding container.

According to an embodiment, the sorting device is designed to feed the containers again at least once for the inspection for foreign substances. In this way, for example, the circumstance can be taken into consideration that a result deviating from the previously defined result does not necessarily justify sorting out. In this case, the container is temporarily sorted out and later reinspected for foreign substances. In a preferred manner, the number of reinspections can be specified in advance. If the result still deviates from the previously defined result for each or a predefined number, a predefined percentage, or the like of the reinspections, the container can be finally sorted out and, for example, either directly removed from the recycling of the intended use of the container or if necessary fed to a manual check, etc.

According to an embodiment of the method, at least one further method for inspecting for foreign substances on the container is carried out before or after carrying out steps a)-i). The advantage of this is increased reliability when determining foreign substances in containers.

According to an embodiment of the method, a container is sorted out if at least one of the results of carrying out steps a)-i) and also of carrying out the further method has revealed foreign substances in the container. The advantage of this is increased reliability when sorting the containers, i.e., distinguishing into containers intended for recycling and containers intended for destruction.

According to an embodiment of the method, the container is subjected to the inspection for foreign substances again at least once if at least one result is not clear and/or several results are contradictory. One of the possible advantages is a high level of reuse of containers with, at the same time, a high level of reliability when sorting out containers that are not intended for recycling.

According to an embodiment of the method, step b) is carried out in such a way that the first fluid is introduced into only one opening of the container. A possible advantage is that an entry of particles, for example particles in the outer edge area of the opening of the container, are not swirled up and thus do not falsify the measurement or analysis. Overall, this further improves the reliability when detecting foreign substances in containers.

Further important features and advantages of the invention result from the dependent claims, from the drawings, and from the associated description of the figures based on the drawings.

It is understood that the features mentioned above and those yet to be explained below may be employed not only in the combination specified in each case, but also in other combinations or alone, without departing from the scope of the present invention.

Preferred designs and embodiments of the invention are shown in the drawings and are explained in more detail in the following description, wherein the same reference symbols refer to identical or similar or functionally identical components or elements.

Moreover, these and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which forms a part hereof and wherein.

In the figures.

DESCRIPTION OF PREFERRED EMBODIMENTS

Figure 1:
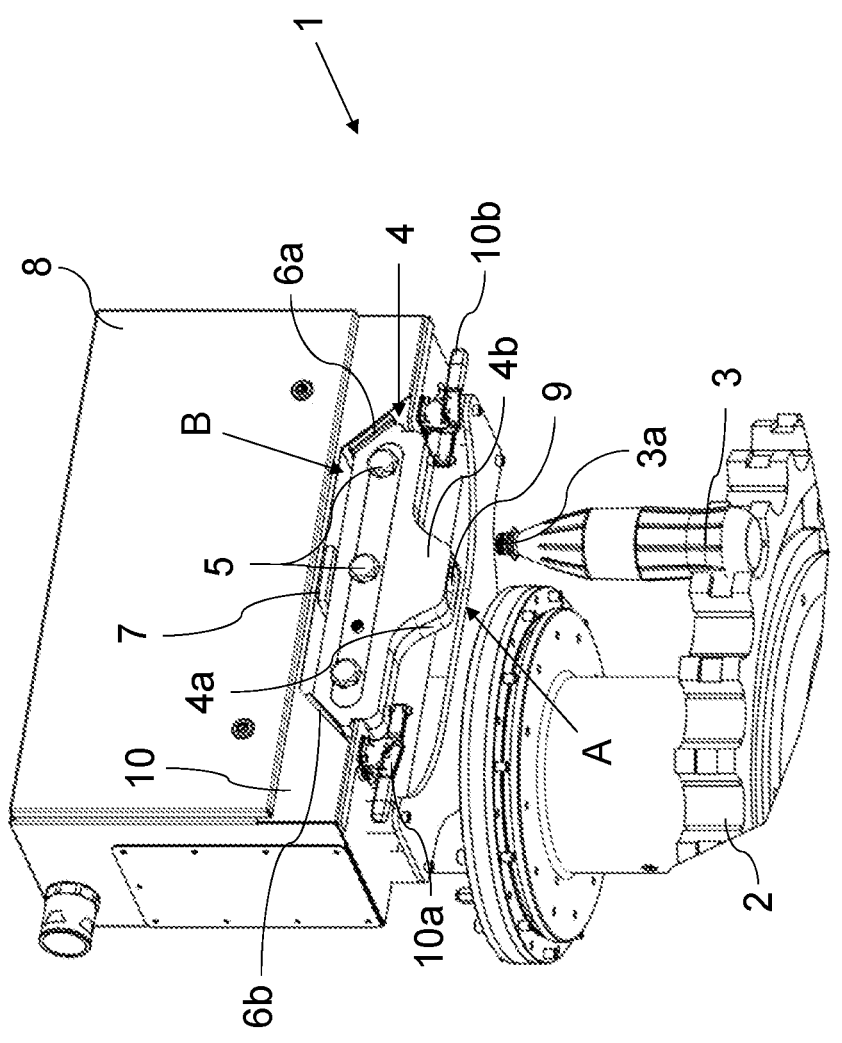
FIG. 1 shows a perspective view in schematic form of an embodiment of the present invention.

Referring now to the drawings wherein the showings are for the purpose of illustrating preferred and alternative embodiments of the invention only and not for the purpose of limiting the same, FIG. 1 shows a perspective view in schematic form of an embodiment of the present invention A device 1 for continuously inspecting bottles 3 for foreign substances is shown in detail in FIG. 1. The bottles 3, here refillable PET bottles (REFPET bottles-refillable polyethylene terephthalate bottles), are transported for this purpose via a circular conveyor 2 to the device 1, more precisely in the area of a sampling head 4 of the device 1. The circular conveyor 2 can be operated at variably adjustable speeds with transport capacities of up to 60,000 bottles per hour. Multiple light barriers (not shown) can be arranged to detect the position of the bottles 3. The sampling head 4 is stationary and operates contactlessly. Oil-free air under pressure from an analysis and air device 8 is injected into an opening 3a of the container 3 via an opening 9 in the sampling head 4 in an essentially continuous or cyclic manner, and the air escaping therefrom is fed through the opening 9 in the sampling head 4 to a measuring cell (see FIG. 2) for analysis. The injection of compressed air by means of the sampling head 4 into the bottles 3 is synchronized accordingly with the circular conveyor 2, in particular in such a way that injection does not take place on or next to the edge of the opening 3a of the bottle 3, but only when injection occurs directly into the opening 3a of the bottle 3. This avoids dirt being swirled up from the edge of the opening 3a of the bottle 3. The synchronization with the analysis and air device 8 can take place electronically or mechanically, for example by means of a pulse or clock generator, so that a compressed air pulse is introduced into the bottle 3 via a nozzle of a compressed air lance and the gas contained therein can flow into the sampling head 4.

The sampling head 4 comprises two half-shells 4a, 4b, which essentially have the same structure and—as can be seen from FIG. 1—essentially have the shape of a "T", with a short vertical leg A and an elongated leg B. In the leg A the opening 9 is arranged on its lower side, in leg B the measuring cell is arranged (see FIG. 2). The two half-shells 4a, 4b are detachably fixed to one another via one or more screw connections 5. The lines, depressions, and openings shown in FIG. 2 can be introduced into the respective half-shells 4a, 4b by means of milling, for example. The sampling head 4 itself can be releasably secured to a holding device 10 by means of quick-action clamping devices 10a, 10b. For this purpose, the sampling head 4 is inserted from below into the holding device 10 with the quick-action clamping devices 10a, 10b open, and these are then closed for the precise positioning of the sampling head 4 in the holding device 10. To apply compressed air, light, and the like to the sampling head 4, a positioning and fluidic access element 7 for the measuring cell arranged in the sampling head 4 is arranged centrally or in the middle of the leg B. A positioning and optical access element 6a, 6b for applying light of at least one wavelength to the measuring cell and for conducting out the light coming from the measuring cell is arranged in the two lateral areas on the left and right on the leg B. Corresponding accesses or devices for using the access elements 6a, 6b, 7 are arranged in the holding device 10 itself (see FIG. 2). In this case, the optical access elements 6a, 6b are arranged at a 45-degree angle to the longitudinal extension of the measuring cell 23, wherein they are not arranged parallel to one another. The arrangement of the optical access elements 6a, 6b essentially "follows" the course of the air flow through the air feed lines 20, 21 arranged on both sides to the measuring cell 23. Other angles are also conceivable if they are arranged essentially tangentially to the air flow. Due to the oblique arrangement of the optical access elements 6a, 6b corresponding to the course of the flow of the sampled air, precipitation of particles on the optical access elements 6a, 6b is avoided. In other words, dirt particles essentially flow past the optical access elements 6a, 6b, so that complex regular cleaning—if at all—can take place at longer time intervals.

Figure 2:
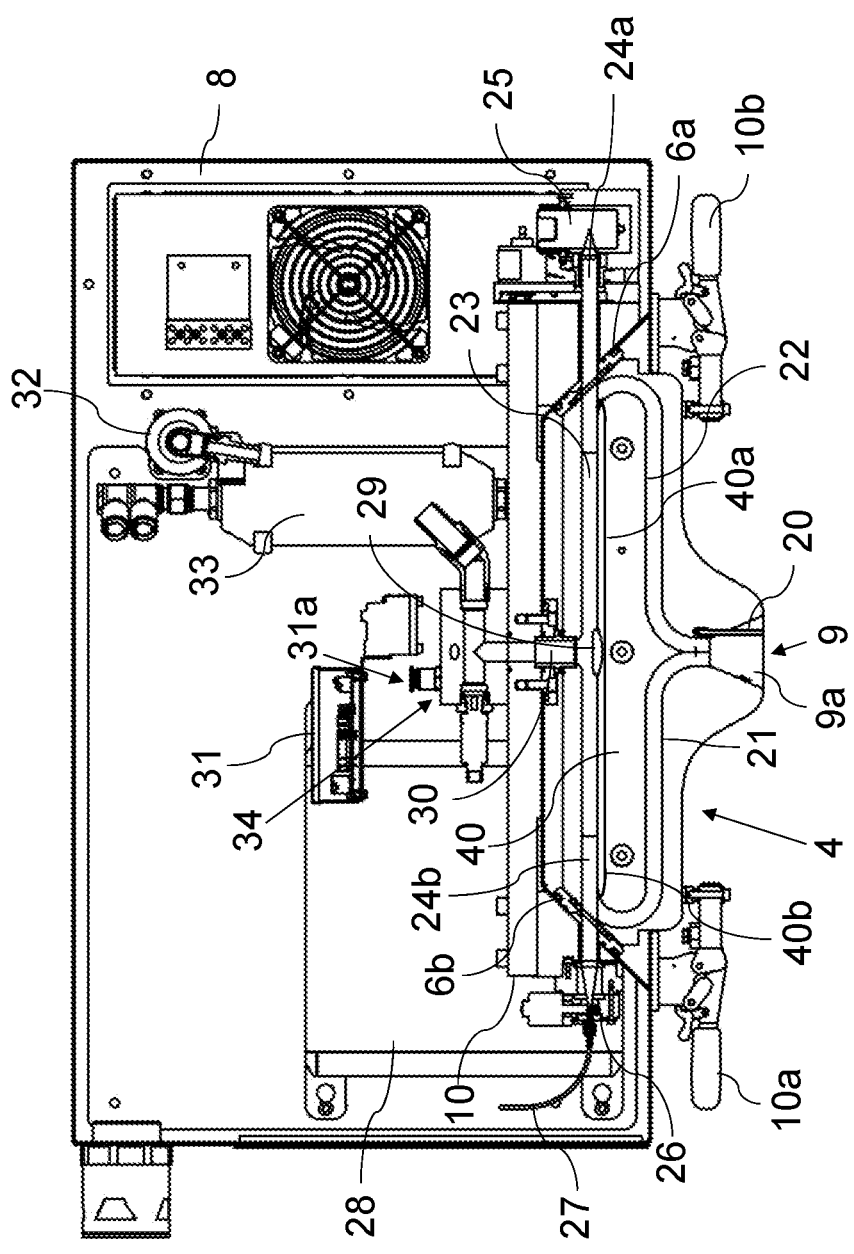
FIG. 2 shows a basic internal structure of a device according to an embodiment of the present invention.

FIG. 2 shows a basic internal structure of a device according to an embodiment of the present invention.

FIG. 2 essentially shows the internal structure of the analysis and air device 8 and of the sampling head 4. As already explained, the sampling head 4 has an opening 9 at its lower end. This is designed conically as a funnel 9a. A compressed air lance 20 which is used to inject oil-free compressed air into a container 3 opens off-center into the funnel 9a. The funnel 9a branches upstream into two essentially S-shaped lines 21, 22, which open out at opposite ends of a measuring cell 23. The measuring cell 23 is essentially designed as an elongate tube or channel parallel to the conveying direction of the containers. The measuring cell 23 can be made of stainless steel, aluminum, and/or plastic. Furthermore, the measuring cell 23 can be provided with an inner coating, which is in particular ceramic and can enable more efficient cleaning of the measuring cell 23 and/or corrosion protection. Alternatively or additionally, it is also possible to prevent the accumulation of foreign substances and thus the occurrence of so-called memory effects. In the middle of the axial extension of the measuring cell 23, an opening 30 is arranged in the upper area, using which the air can be extracted from the measuring cell 23. In addition, a compressed air connection (not shown) is arranged, which fluidically connects a valve and air control device 34, in particular possibly having a filter, having an overpressure buffer store 33 to the compressed air lance 20. A recess 29 is arranged in the tube opposite to the opening 30. This is used to collect dirt in the area of the opening 30: Due to the extraction via the opening 30, air vortices are formed, which result in the settling of any particles that may be present. Therefore, they do not get into other components of the device 1, which extends the overall service life or the service life until the next cleaning. It is also possible to place a filter for filtering the extracted air upstream of the opening 30. This prevents coarse dirt from the environment, in particular from the container, which is also transported by the second fluid when the first fluid is introduced, from getting into the suction system and soiling it. The reliability of the device can thus be further improved. In addition, a further filter can be arranged downstream of the filter just mentioned, for example in the lines 21, 22, which provides further filtering of the sampled air. This filter can be arranged in particular in the sampling head 4 in such a way that particularly simple maintenance is made possible by easy accessibility thereto.

For optical access to the measuring cell 23, it and the sampling head 4 have optical accesses 24a, 24b at the axial ends of the tubular measuring cell 23. A light source 25 is connected to the one optical access 24a in order to apply UV light to the measuring cell 23. On the other axial side of the measuring cell 23, the optical access 24b is connected to a high-resolution detector 26. The spectrometer formed in this way-light source 25, measuring cell 23, and detector 26—can be used as an optical UV spectrometer with grating dispersion of the optical radiation, which is operable in a wavelength range between 150 nm and 500 nm, preferably between 190 nm and 400, and is embodied using Si sensors arranged in an array in a line, optionally with a number of 256, 512, 1024 pixel elements or the like. Xenon and/or deuterium emitters can be used as the light source 25. It is thus possible to provide high-resolution spectroscopy with spectral differentiation and a spectral resolution of less than 3 nm, in particular less than 1 nm.

The advantage of this is that a high level of accuracy is achieved when detecting the foreign substances. The light coming from the measuring cell can then be detected by means of the detector 26. The detector 26 is then connected to the analysis device 28 via an optical connection 27. The air taken from the container is thus examined spectroscopically in the measuring cell 23 and based on the data obtained from the spectroscopic inspection, the foreign substance(s) and in particular their concentrations are/are determined by means of the analysis device 28. The analysis can be carried out using multivariate calibration methods, chemometric methods, and/or a comparison of the recorded spectra with reference spectra, so-called "fingerprints". In the description, in particular in the claims, multivariate calibration is to be understood, for example, as so-called "multiple linear regression" (MLR) or "principal component regression" (PCR) as well as partial least squares regression or "partial least squares" (PLS) regression. Alternatively or additionally, one or more neural networks can also be used to determine foreign substances on the basis of the recorded spectra.

Furthermore, a cleaning device 40 is arranged, which essentially comprises two lines 40a, 40b here and which open into the measuring cell 23 or into the feed lines 21, 22 in the area of the optical accesses of the measuring cell. Compressed air or, in general, a cleaning fluid can be introduced into the measuring cell 23 via the lines 40a, 40b in order to clean it and this can be discharged again via the opening 30. For this purpose, the lines 40a, 40b are connected to a corresponding provision device for compressed air, for a cleaning fluid, or the like, for example using the valve and air control device 34 and the overpressure buffer store 33 (connection not shown here). The feed of the cleaning medium, in particular the compressed air, can take place here centrally in the two equally long and symmetrically constructed lines 40a, 40b. The lines 40a, 40b can have a smaller diameter in this case than the lines 21, 22.

Overall, the funnel 9a is connected downstream via the lines 21, 22, the measuring cell 23, and via the opening 30 to a negative pressure device, here having a Venturi nozzle 32, so that air can be continuously discharged from the funnel 9a into the measuring cell 23 and out of it via the opening 30 again. In order to provide compressed air for injection into the opening 3a of a container 3, the compressed air lance 20 is connected upstream to a valve and air control device 34 which is arranged in a stationary manner. In addition to the overpressure buffer store 33 already mentioned, this comprises a multiple valve 31a which is controlled by a valve controller 31. The multiple valve 31a includes multiple smaller and therefore faster switching valves, which enable a rapid sequence of compressed air pulses in contrast to a larger valve having the same compressed air throughput. In addition, one or more pressure sensors can be arranged at a suitable position in the flow path in order to measure a control of the pressure both during injection and during extraction.

Figure 3:
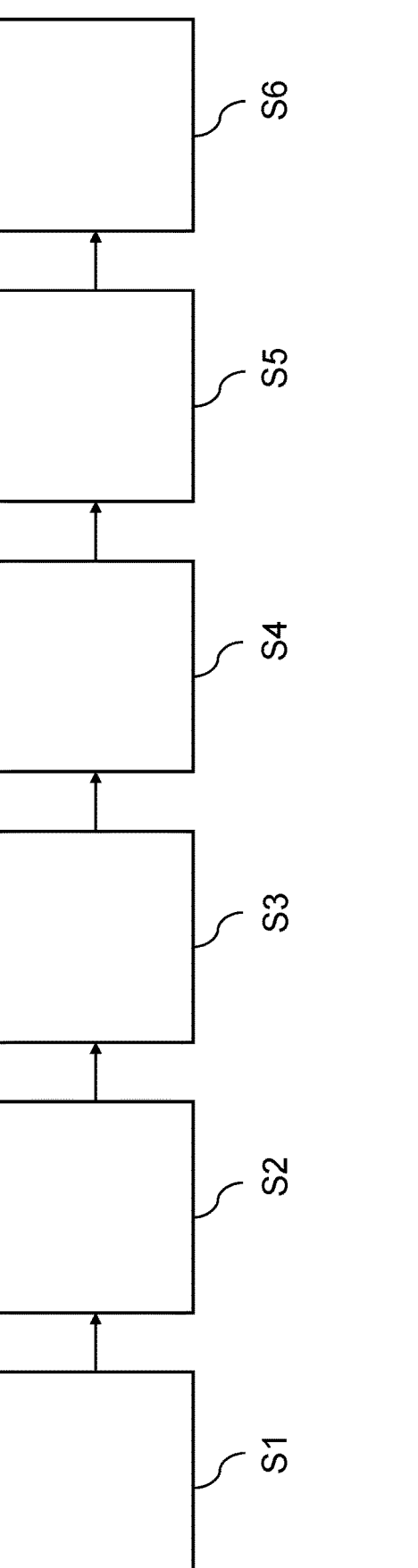
FIG. 3 shows steps of a method according to an embodiment of the present invention.

FIG. 3 shows steps of a method according to an embodiment of the present invention.

In detail, FIG. 3 shows in schematic form steps of a method for inspecting containers for foreign substances by means of a device according to any one of claims 1-8.

The method comprises the following steps:

a) feeding S1 a container to the sampling head of the device in a suitable position for sampling, b) introducing S2 a quantity of a first fluid into the container by means of the sampling head, c) removing S3 a quantity of a second fluid from the at least one container for inspection for foreign substances by means of the sampling head, d) feeding S4 the removed quantity of the second fluid into the measuring cell, e) performing S5 a spectroscopic analysis of the second fluid in the measuring cell, and f) determining S6 foreign substances in the container based on a result of the spectroscopic analysis.

It can then be decided based on the result of the analysis as to whether the inspected container should be reinspected, sorted out, or fed to the recycling process.

Figure 4:
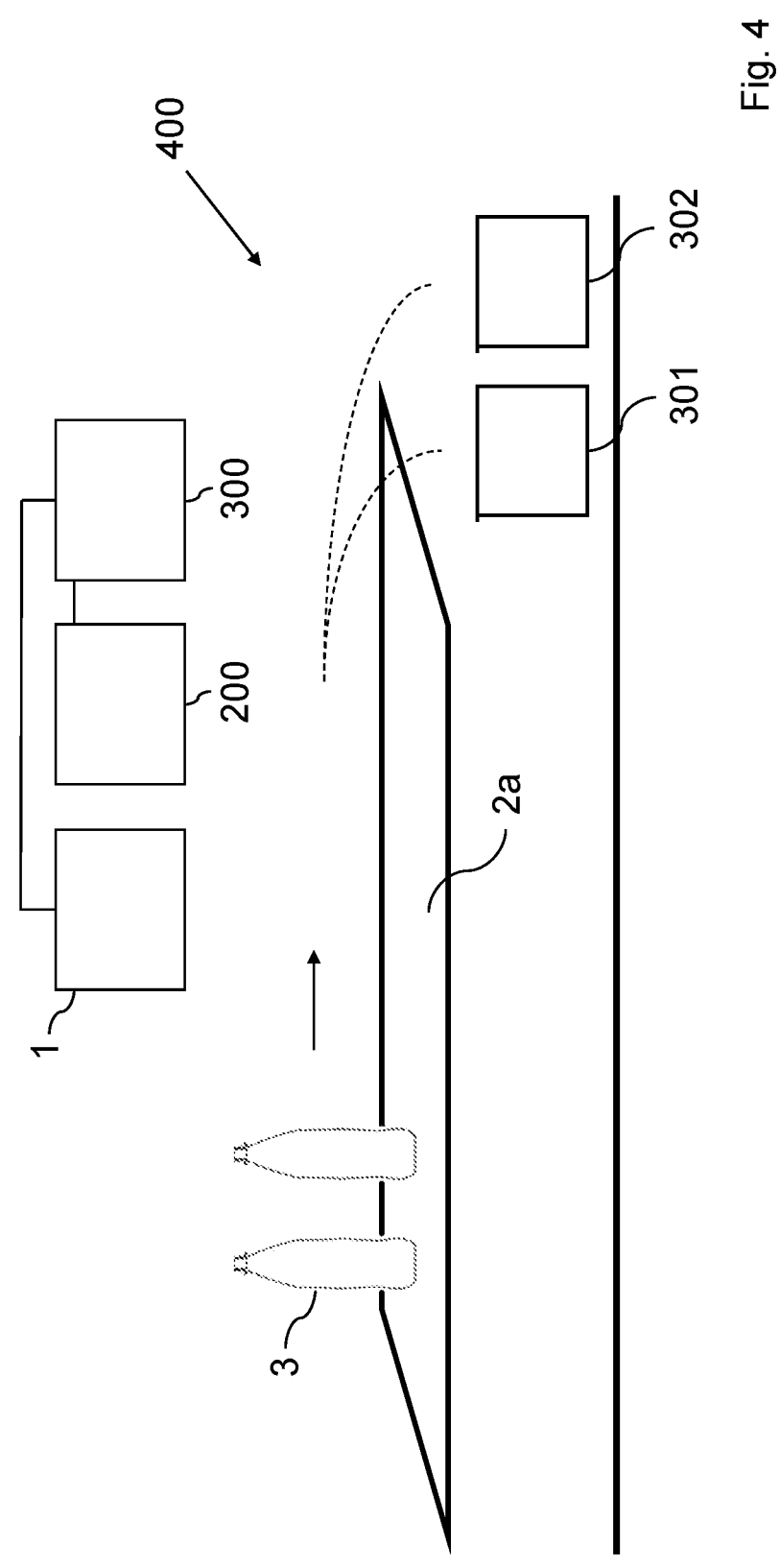
FIG. 4 shows a sorting system having a device according to an embodiment of the present invention in schematic form.

FIG. 4 shows a sorting system having a device according to an embodiment of the present invention in schematic form.

A sorting system 400 is shown schematically in FIG. 4. The sorting system 400 includes a container conveyor device 2a, which conveys containers 3 in a conveying direction. A device 1 for inspecting the containers 3 for foreign substances is arranged first in the conveying direction, in particular wherein liquid foreign substances having negligible vapor pressure are inspected. A second device 200 for inspected containers for foreign substances is arranged further in the conveying direction. This can operate, for example, according to the transmitted light principle and apply light to the liquid collected at the bottom of the container 3. Using the light passing through the residual liquid, it can then be determined by means of a detector and an analysis device whether and, if so, which foreign substances are in the container 3.

Both devices 1, 200 are connected to a sorting device 300 which, depending on the analysis results of the devices 1, 200, decides how the containers 3 are to be sorted. By way of example, two collecting containers 301, 302 are arranged here, into which the sorting device 300 can sort the corresponding containers 3, for example containers 3 suitable for the recycling cycle into the collecting container 301 and accordingly unsuitable containers 3 into the collecting container 302. If the results of the two devices are unclear, it is also possible to provide a feed device in order to have containers inspected checked again for foreign substances by device 1 and/or device 200.

In summary, the present invention enables at least one of the following advantages and/or provides at least one of the following features:

Higher reliability and accuracy of the detection of foreign substances.

Smaller installation space.

Easy to implement, maintain, and clean.

High container throughput possible, in particular due to fast filling of the measuring cell.

Although the present invention has been described on the basis of preferred exemplary embodiments, it is not limited thereto but can be modified in many different ways.

Moreover, while considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

LIST OF REFERENCE SIGNS 1 device
2 circular conveyor
2a linear conveyor
3 bottle
3a bottle opening
4 sampling head
4a, 4b part of sampling head
5 screw connection
6a, 6b positioning and optical access element of measuring cell
7 positioning and fluidic access element of measuring cell
8 analysis and air device
9 opening of sampling head
9a funnel
10 holder of sampling head
10a, 10b quick-action clamping device of sampling head
20 compressed air lance
21, 22 air feed line of measuring cell
23 measuring cell
24a light line to the measuring cell
24b light line to the detector
25 UV lamp
26 detector
27 light guide
28 analysis device
29 central bulge of measuring cell
30 air discharge of measuring cell
31 valve controller
31a multiple valve
32 Venturi nozzle
33 overpressure buffer store
34 valve and air control device
40 cleaning device
40a, 40b air channel
200 transmitted light device
300 sorting device
301, 302 container
400 container sorting system
A, B leg
S1-S6 method steps

The invention claimed is:

1. A device for inspecting containers for foreign substances, the device comprising:
   a sampling head, wherein by way of the sampling head, a quantity of an associated first fluid is introducible into an associated container contactlessly via an opening of the sampling head by a fluid introduction device in the sampling head,
   wherein, by way of the sampling head, a quantity of an associated second fluid to be inspected for foreign substances is contactlessly removable from the associated container,
   wherein a measuring cell for optically inspecting the associated second fluid is at least partially arranged in the sampling head and fixed relative to the fluid introduction device wherein the opening of the sampling head is fluidically connected to the measuring cell via at least two lines.

2. The device according to claim 1, wherein the sampling head is detachably arranged in a holding device.

3. The device according to claim 2, wherein the holding device includes at least two optical accesses which are used for optical access to the measuring cell.

4. The device according to claim 3, wherein the fluid introduction device includes a valve device, having a plurality of valves for providing pressure pulses for the associated first fluid for introduction into the associated container.

5. The device according to claim 4, wherein the measuring cell includes an outlet for discharging the associated second fluid, which can be connected to a vacuum device.

6. The device according to claim 3, wherein the opening of the sampling head is designed as a funnel, which is fluidically connected to the measuring cell, in an area adjacent to the opening of the associated container.

7. The device according to claim 6, wherein the fluid introduction device is arranged off-center in the funnel.

8. The device according to claim 3, wherein the fluid introduction device is designed to introduce the associated cleaning fluid into the measuring cell and/or into at least one line leading to the measuring cell at at least two axial ends of the measuring cell.

9. The device according to claim 1, wherein a cleaning device for the measuring cell is arranged, wherein the cleaning device includes an introduction device for introducing an associated cleaning fluid into the measuring cell.

10. The device according to claim 1, wherein the sampling head is stationary.

11. The device according to claim 10, wherein the sampling head has an at least two-part structure and wherein at least two parts of the at least two-part structure are detachably attachable to one another.

12. The device according to claim 1, wherein a conveyor device for the containers is arranged in such a way that the containers are guided past the sampling head and/or
   wherein a fluid provision device is arranged, which is designed to provide the first associated fluid in the form of a gas or gas mixture.

13. The device according to claim 1, wherein an analysis device for analyzing the associated second fluid for foreign substances is arranged, which is connected to the measuring cell.

14. The device according to claim 13, wherein the analysis device and the measuring cell are designed to determine foreign substances by way of an UV spectroscopy of the associated second fluid.

15. The device according to claim 13, wherein a sorting device is arranged, which is designed to sort out containers of the associated container deviating from a previously defined result on the basis of a result from the analysis device.

16. The device according to claim 15, wherein the sorting device is designed to feed the containers again at least once for the inspection for foreign substances.

17. A method for examining containers for foreign substances by means of a device according to claim 1, comprising the steps
   a) feeding a container to the sampling head of the device in a suitable position for sampling,
   b) introducing a quantity of a first fluid into the container by means of the sampling head, c) removing a quantity of a second fluid from the at least one container for inspection for foreign substances by means of the sampling head, d) feeding the removed quantity of the second fluid into the measuring cell, e) performing a spectroscopic analysis of the second fluid in the measuring cell, and f) determining foreign substances in the container based on a result of the spectroscopic analysis.

18. The method according to claim 17, wherein the container is subjected to the inspection for foreign substances again at least once if at least one result is not clear and/or several results are contradictory.

19. The method according to claim 17, wherein at least one further method for examining foreign substances on the container is carried out before or after carrying out steps a) through f).

\* \* \* \* \*